US012509059B2

(12) United States Patent
Jing et al.

(10) Patent No.: US 12,509,059 B2
(45) Date of Patent: Dec. 30, 2025

(54) PARALLEL START CONTROL METHOD AND SYSTEM FOR HYBRID ELECTRIC VEHICLE, AND HYBRID ELECTRIC VEHICLE

(71) Applicants: NINGBO GEELY ROYAL ENGINE COMPONENTS CO., LTD, Zhejiang (CN); AUROBAY TECHNOLOGY CO., LTD., Zhejiang (CN); ZHEJIANG GEELY HOLDING GROUP CO., LTD, Zhejiang (CN)

(72) Inventors: Junchao Jing, Zhejiang (CN); Yiqiang Liu, Zhejiang (CN); Weishan Huang, Zhejiang (CN); Jun Yang, Zhejiang (CN); Botao Zuo, Zhejiang (CN); Xuemei Yu, Zhejiang (CN); Ruiping Wang, Zhejiang (CN); Ingo Scholten, Zhejiang (CN)

(73) Assignees: NINGBO GEELY ROYAL ENGINE COMPONENTS CO., LTD, Ningbo (CN); AUROBAY TECHNOLOGY CO., LTD., Ningbo (CN); ZHEJIANG GEELY HOLDING GROUP CO., LTD, Hangzhou (CN)

( * ) Notice: Subject to any disclaimer, the term of this patent is extended or adjusted under 35 U.S.C. 154(b) by 162 days.

(21) Appl. No.: 18/287,938

(22) PCT Filed: Aug. 19, 2021

(86) PCT No.: PCT/CN2021/113558
§ 371 (c)(1),
(2) Date: Oct. 23, 2023

(87) PCT Pub. No.: WO2023/019515
PCT Pub. Date: Feb. 23, 2023

(65) Prior Publication Data
US 2024/0199002 A1 Jun. 20, 2024

(51) Int. Cl.
*B60W 20/40* (2016.01)
*B60W 10/02* (2006.01)
(Continued)

(52) U.S. Cl.
CPC ............ *B60W 20/40* (2013.01); *B60W 10/02* (2013.01); *B60W 10/06* (2013.01);
(Continued)

(58) Field of Classification Search
CPC ...... B60W 20/40; B60W 10/02; B60W 10/06; B60W 30/18027; B60W 40/12;
(Continued)

(56) References Cited

U.S. PATENT DOCUMENTS

2017/0137017 A1  5/2017 Cho
2020/0207330 A1  7/2020 Mizuno et al.

FOREIGN PATENT DOCUMENTS

CN   101362461 A   2/2009
CN   104884325 A   9/2015
(Continued)

OTHER PUBLICATIONS

Chinese Intellectual Property Office (ISR/CN), "International Search Report for PCT/CN2021/113558", China, May 18, 2022.
(Continued)

*Primary Examiner* — Brian P Sweeney
(74) *Attorney, Agent, or Firm* — Westbridge IP LLC

(57) ABSTRACT

Disclosed are a parallel start control method and system for a hybrid electric vehicle, and a hybrid electric vehicle. The parallel start control method includes: acquiring current working conditions of a clutch and a gearbox of the hybrid electric vehicle, an engine request torque of the hybrid electric vehicle and a start mode of the hybrid electric vehicle; judging whether the hybrid electric vehicle meets an over-heat protection condition according to the current
(Continued)

working conditions of the clutch and the gearbox, and determining a start basic torque according to a judging result and the engine request torque; determining a start clutch request torque based on the start basic torque according to the start mode of the hybrid electric vehicle; and conducting start control on the clutch according to the start clutch request torque. The start security, responsiveness and power performance of the hybrid electric vehicle are improved.

19 Claims, 9 Drawing Sheets

(51) Int. Cl.
  B60W 10/06 (2006.01)
  B60W 30/18 (2012.01)
  B60W 40/12 (2012.01)
  B60W 50/00 (2006.01)
(52) U.S. Cl.
  CPC ...... *B60W 30/18027* (2013.01); *B60W 40/12* (2013.01); *B60W 50/0098* (2013.01); *B60W 2050/0026* (2013.01); *B60W 2510/0208* (2013.01); *B60W 2510/0291* (2013.01); *B60W 2510/0638* (2013.01); *B60W 2510/0657* (2013.01); *B60W 2510/1005* (2013.01); *B60W 2520/10* (2013.01); *B60W 2540/12* (2013.01); *B60W 2710/027* (2013.01); *B60W 2710/0666* (2013.01); *B60Y 2200/92* (2013.01); *B60Y 2300/42* (2013.01); *B60Y 2300/71* (2013.01)

(58) Field of Classification Search
  CPC ..... B60W 50/0098; B60W 2050/0026; B60W 2510/0208; B60W 2510/0291; B60W 2510/0638; B60W 2510/0657; B60W 2510/1005; B60W 2520/10; B60W 2540/12; B60W 2710/027; B60W 2710/0666; B60W 2510/0216; B60W 2510/0604; B60W 10/08; B60W 20/15; B60W 20/50; B60W 20/10; B60Y 2200/92; B60Y 2300/42; B60Y 2300/71; B60K 6/442; Y02T 10/62
  See application file for complete search history.

(56) References Cited

FOREIGN PATENT DOCUMENTS

| | | |
|---|---|---|
| CN | 105143643 A | 12/2015 |
| CN | 106560637 A | 4/2017 |
| CN | 112503115 A | 3/2021 |
| CN | 112677958 A | 4/2021 |
| EP | 1762452 A2 | 3/2007 |
| WO | 03074894 A2 | 9/2003 |
| WO | WO2003074894 A2 * | 9/2003 |
| WO | 2015090192 A1 | 6/2015 |

OTHER PUBLICATIONS

EPO, "1st EP Office Action for EP Application No. 21935438.8", Europe.

* cited by examiner

PARALLEL START CONTROL METHOD AND SYSTEM FOR HYBRID ELECTRIC VEHICLE, AND HYBRID ELECTRIC VEHICLE

CROSS-REFERENCE TO RELATED PATENT APPLICATION

This application is a U.S. national stage application of PCT Patent Application No. PCT/CN2021/113558 filed Aug. 19, 2021, which is incorporated herein in its entirety by reference.

FIELD OF THE INVENTION

The present invention relates to the technical field of vehicle control, and particularly to a parallel start control method and system for a hybrid electric vehicle, and a hybrid electric vehicle.

BACKGROUND OF THE INVENTION

With the development of electrification systems and increasingly stringent requirements of national regulations on fuel consumption and emissions, hybrid power technology becomes the key to achievement of energy conservation and emission reduction. In the prior art, there is a dual-motor hybrid power system, and the dual-motor hybrid power system has three modes, namely a pure electric mode, a serial mode and a parallel mode. As shown in FIG. 1, the dual-motor hybrid power system drives wheels through a motor P2 in the serial mode, a clutch C0 is not engaged, an engine charges a battery through a motor P1, and the motor P2 drives the wheels. In the parallel mode, the clutch C0 is engaged, and the engine directly drives the wheels.

Poor start control on a hybrid electric vehicle not only affects the response of the system, but also results in engine flameout because of improper clutch torque control, and hardware damage and the like may also be caused since clutch and transmission oil temperatures are not considered. Therefore, a reasonable start control method for the hybrid electric vehicle is very important.

BRIEF DESCRIPTION OF THE INVENTION

In view of the above problem, the present invention provides a parallel start control method and system for a hybrid electric vehicle, and a hybrid electric vehicle for overcoming the above problems or at least partially solving the problems.

One object of the present invention is how to improve the start security of a hybrid electric vehicle.

Another object of the present invention is how to control a clutch torque to avoid engine flameout caused by improper clutch torque control.

Yet another object of the present invention is how to control the clutch torque to improve responsiveness, power performance and security in the start process.

Yet another object of the present invention is how to control the engine torque to avoid engine flameout, and further improve responsiveness, power performance and security in the start process.

Particularly, the present invention provides a parallel start control method for a hybrid electric vehicle, including the following steps:
  acquiring current working conditions of a clutch and a gearbox of the hybrid electric vehicle, an engine request torque of the hybrid electric vehicle and a start mode of the hybrid electric vehicle;
  judging whether the hybrid electric vehicle meets an over-heat protection condition according to the current working conditions of the clutch and the gearbox, and determining a start basic torque according to a judging result and the engine request torque;
  determining a start clutch request torque based on the start basic torque according to the start mode of the hybrid electric vehicle; and
  conducting start control on the clutch according to the start clutch request torque.

Further, the step of judging whether the hybrid electric vehicle meets the over-heat protection condition according to the current working conditions of the clutch and the gearbox, and determining the start basic torque according to the judging result and the engine request torque includes:
  when the clutch is in an incompletely engaged working condition and the gearbox is in an in-gear working condition, judging whether the hybrid electric vehicle meets the over-heat protection condition; and
  when determining that the hybrid electric vehicle meets the over-heat protection condition, subtracting a preset over-heat protection offset torque from the engine request torque, to obtain the start basic torque.

Further, when the start mode of the hybrid electric vehicle is an accelerator pedaling start mode, the step of determining the start clutch request torque based on the start basic torque according to the start mode of the hybrid electric vehicle includes:
  limiting upper and lower limits of the start basic torque, to obtain a first start limiting torque;
  adding a start pre-engagement torque and a start clutch compensation torque of the hybrid electric vehicle to the first start limiting torque, to obtain a first pre-request clutch torque;
  when a brake pedal of the hybrid electric vehicle is pressed, determining a brake clutch request torque when the brake pedal is pressed according to a crankshaft brake force and the first pre-request clutch torque of the hybrid electric vehicle;
  taking a smaller one of the first pre-request clutch torque and the brake clutch request torque as a first to-be-requested clutch torque;
  when an engine rotation speed of the hybrid electric vehicle is smaller than a target idle rotation speed, determining an anti-flameout clutch torque by looking up a table according to a variation rate of the engine rotation speed and a difference obtained by subtracting the target idle rotation speed from the engine rotation speed; and
  taking a smaller one of the first to-be-requested clutch torque and the anti-flameout clutch torque as the start clutch request torque.

Further, the step of determining the start clutch request torque based on the start basic torque according to the start mode of the hybrid electric vehicle further includes:
  when the brake pedal of the hybrid electric vehicle is not pressed, and the engine rotation speed is greater than or equal to the target idle rotation speed, taking the first pre-request clutch torque as the start clutch request torque;
  when the brake pedal of the hybrid electric vehicle is not pressed, and the engine rotation speed is smaller than the target idle rotation speed, taking a smaller one of the first pre-request clutch torque and the anti-flameout clutch torque as the start clutch request torque; and when the brake pedal of the hybrid electric vehicle is pressed, and the engine rotation speed is greater than or equal to the target idle rotation speed, taking the first pre-request clutch torque as the start clutch request torque.

Further, when the start mode of the hybrid electric vehicle is a neutral taxiing start mode, the step of determining the start clutch request torque based on the start basic torque according to the start mode of the hybrid electric vehicle includes:

taking a larger one of the start basic torque and zero, and limiting upper and lower limits of the value of the larger one, to obtain a second start limiting torque;

when the brake pedal of the hybrid electric vehicle is pressed, taking a smaller one of the second start limiting torque and the brake clutch request torque as a second to-be-requested clutch torque;

when the engine rotation speed of the hybrid electric vehicle is smaller than the target idle rotation speed, determining an anti-flameout clutch torque by looking up a table according to a variation rate of the engine rotation speed and a difference obtained by subtracting the target idle rotation speed from the engine rotation speed; and taking a smaller one of the second to-be-requested clutch torque and the anti-flameout clutch torque as the start clutch request torque.

Further, the step of determining the start clutch request torque based on the start basic torque according to the start mode of the hybrid electric vehicle further includes:

when the brake pedal of the hybrid electric vehicle is not pressed, and the engine rotation speed is greater than or equal to the target idle rotation speed, taking the second start limiting torque as the start clutch request torque;

when the brake pedal of the hybrid electric vehicle is not pressed, and the engine rotation speed is smaller than the target idle rotation speed, taking a smaller one of the second start limiting torque and the anti-flameout clutch torque as the start clutch request torque; and when the brake pedal of the hybrid electric vehicle is pressed, and the engine rotation speed is greater than or equal to the target idle rotation speed, taking the second to-be-requested clutch torque as the start clutch request torque.

Further, when the start mode of the hybrid electric vehicle is a launch control start mode, the step of determining the start clutch request torque based on the start basic torque according to the start mode of the hybrid electric vehicle includes:

adding the start pre-engagement torque and the start clutch compensation torque of the hybrid electric vehicle to the start basic torque, to obtain a second pre-request clutch torque;

when the engine rotation speed of the hybrid electric vehicle is smaller than the target idle rotation speed, determining the anti-flameout clutch torque by looking up a table according to the variation rate of the engine rotation speed and the difference obtained by subtracting the target idle rotation speed from the engine rotation speed;

taking a smaller one of the second pre-request clutch torque and the anti-flameout clutch torque as the start clutch request torque; and when the engine rotation speed of the hybrid electric vehicle is greater than or equal to the target idle rotation speed, taking the second pre-request clutch torque as the start clutch request torque.

Further, the start clutch compensation torque is acquired by:

selecting a target rotation speed calculation method corresponding to the start mode from multiple preset target rotation speed calculation methods according to the start mode of the hybrid electric vehicle, and calculating a target engine rotation speed of a next cycle by using the target rotation speed calculation method;

limiting upper and lower limits of the target engine rotation speed, to obtain an engine target limiting rotation speed;

subtracting an actual engine rotation speed from the engine target limiting rotation speed, to obtain a target engine rotation speed difference;

searching a target P-term coefficient corresponding to the target engine rotation speed difference from a second preset mapping relationship table storing a relationship between the target engine rotation speed difference and a P-term coefficient;

multiplying the target P-term coefficient with the target engine rotation speed difference, and then multiplying with a preset engine rotation inertia, to obtain a P-term torque; and negating the P-term torque to obtain the start clutch compensation torque.

Further, the step of selecting the target rotation speed calculation method corresponding to the start mode from multiple preset target rotation speed calculation methods according to the start mode of the hybrid electric vehicle, and calculating the target engine rotation speed of the next cycle by using the target rotation speed calculation method includes: when the start mode of the hybrid electric vehicle is the accelerator pedaling start mode or the launch control start mode, selecting a first target engine rotation speed calculation method to calculate the target engine rotation speed, and the first target engine rotation speed calculation method includes the following steps:

acquiring a torque sum of the engine and motor of the hybrid electric vehicle, to obtain an overall torque;

taking a smaller one of the overall torque and the engine request torque, to obtain a target smaller torque;

acquiring temperatures of the clutch and the gearbox;

when the temperature of the clutch is smaller than 185° C., and the temperature of the gearbox is smaller than 100° C., searching a target engine rotation speed corresponding to the target smaller torque and a current engine request torque from a first preset relationship table storing the relationship between smaller torques, engine request torques and engine rotation speeds; and when the temperature of the clutch is greater than 200° C., and the temperature of the gearbox is greater than 110° C., searching the target engine rotation speed corresponding to the target smaller torque and the current engine request torque from a second preset relationship table storing the relationship between smaller torques, engine request torques and engine rotation speeds, wherein the second preset relationship table is different from the first preset relationship table.

Further, the step of selecting the target rotation speed calculation method corresponding to the start mode from multiple preset target rotation speed calculation methods according to the start mode of the hybrid electric vehicle, and calculating the target engine rotation speed of the next cycle by using the target rotation speed calculation method includes: when the start mode of the hybrid electric vehicle is the neutral taxiing start mode, selecting a second target engine rotation speed calculation method to calculate the target engine rotation speed, and the second target engine rotation speed calculation method includes the following steps:
- acquiring a start acceleration when the hybrid electric vehicle starts;
- comparing the start acceleration with a preset acceleration;
- when the start acceleration is smaller than the preset acceleration, searching a target engine rotation speed of the next cycle corresponding to a current engine rotation speed from a third preset relationship table storing the relationship between the current engine rotation speed and the engine rotation speed of the next cycle; and
- when the start acceleration is greater than or equal to the preset acceleration, searching the target engine rotation speed of the next cycle corresponding to the current engine rotation speed from a fourth preset relationship table storing the relationship between the current engine rotation speed and the target engine rotation speed of the next cycle, wherein the fourth preset relationship table is different from the third preset relationship table.

Further, the steps of judging whether the hybrid electric vehicle meets the over-heat protection condition according to the current working conditions of the clutch and the gearbox, and determining the start basic torque according to the judging result and the engine request torque; and determining the start clutch request torque based on the start basic torque according to the start mode of the hybrid electric vehicle, include:
- when the clutch is in a completely engaged working condition, judging whether the hybrid electric vehicle meets the over-heat protection condition;
- when determining that the hybrid electric vehicle meets the over-heat protection condition, subtracting a preset over-heat protection offset torque from the engine request torque, to obtain the start basic torque, and taking the start basic torque as the start clutch request torque; and
- when the hybrid electric vehicle does not meet the over-heat protection condition, taking the engine request torque as the start clutch request torque.

Further, it is determined that the over-heat protection condition is met when the following conditions are met synchronously:
- the temperature of the clutch is greater than or equal to 220° C., and the temperature of the gearbox is greater than or equal to 120° C.;
- the start mode of the hybrid electric vehicle is the accelerator pedaling start mode or launch control start mode;
- the variation rate of the engine request torque is smaller than a first preset variation rate when the brake pedal of the hybrid electric vehicle is pressed, the variation rate of the engine request torque is smaller than a second preset variation rate when the brake pedal is not pressed, the first preset variation rate being smaller than the second preset variation rate;
- the difference obtained by subtracting the engine request torque from a maximum engine torque limit value corresponding to the current engine rotation speed of the hybrid electric vehicle is greater than a preset torque value; and
- a current vehicle speed of the hybrid electric vehicle is smaller than or equal to a preset speed vehicle.

Further, the parallel start control method for the hybrid electric vehicle further includes the following step:
- when the clutch is in the incompletely engaged working condition and the gearbox is in an off-gear working condition, determining that the start clutch request torque is equal to zero.

Further, the parallel start control method for the hybrid electric vehicle further includes the following step:
- when the clutch is in the completely engaged working condition, or the clutch is in the incompletely engaged working condition and the gearbox is in the off-gear working condition, determining that the engine compensation torque is equal to zero;
- when the clutch is in the incompletely engaged working condition and the gearbox is in the in-gear working condition, calculating the engine compensation torque by using an engine compensation torque calculation method;
- adding the engine compensation torque to the engine request torque, to obtain an engine target torque;
- when the brake pedal of the hybrid electric vehicle is pressed, limiting the limits of the engine target torque, to obtain a start engine request torque; and
- conducting start control on the engine according to the start engine request torque.

Further, the engine compensation torque calculation method includes the following steps:
- when the hybrid electric vehicle meets the over-heat protection condition, adding a start engine compensation torque to the start pre-engagement torque of the hybrid electric vehicle, and further adding the preset over-heat protection offset torque, to obtain the engine compensation torque, wherein the start engine compensation torque is equal to the P-term torque of the hybrid electric vehicle;
- when the hybrid electric vehicle does not meet the over-heat protection condition, adding the start engine compensation torque to the start pre-engagement torque, to obtain the engine compensation torque.

Further, in the step of, when the brake pedal of the hybrid electric vehicle is pressed, limiting the limits of the engine target torque, to obtain the start engine request torque, the method of limiting the limits of the engine target torque includes:
- when the brake pedal of the hybrid electric vehicle is pressed, determining a brake clutch request torque when the brake pedal is pressed; and
- taking a smaller one of the engine target torque and the brake engine request torque as the start engine request torque.

Further, the start pre-engagement torque is determined by:
- acquiring a current vehicle speed of the hybrid electric vehicle; and
- looking up a first preset mapping relationship table storing the relationship between the vehicle speed and the start pre-engagement torque, to determine the start pre-engagement torque corresponding to the current vehicle speed.

Specifically, the present invention further provides a parallel start control system for a hybrid electric vehicle, including a control device, wherein the control device includes a memory and a processor, a control program is stored in the memory, and the control program is used to implement the parallel start control methods for the hybrid electric vehicle described above when executed by the processor.

Specifically, the present invention further provides a hybrid electric vehicle, including the parallel start control system for the hybrid electric vehicle.

According to the solution of the present invention, whether the hybrid electric vehicle meets an over-heat protection condition is judged according to current working conditions of a clutch and a gearbox, a start basic torque is then determined according to a judging result and an engine request torque, a start clutch request torque is also determined based on the start basic torque according to a start mode of the hybrid electric vehicle, and thus an over-heat protection torque is considered in the process of start control on the clutch, and different start clutch request torques are available in different start modes, so that the start security of the hybrid electric vehicle is improved.

Further, by setting multiple start control modes in the start process, specifically a neutral taxiing start mode, a launch control start mode and an accelerator pedaling start mode, an over-heat working condition and a brake working condition are both processed in each start mode, and meanwhile, an anti-flameout protection is also added, so that the power performance and the security of the system are improved, and start response is also improved.

Further, by controlling an engine torque, engine flameout can be further avoided, and the responsiveness, power performance and security in the start process can be further improved.

The above description is only an overview of the technical solution of the present invention. To understand more clearly the technical means of the present invention, to implement in accordance with the contents of the specification, and to make the above and other purposes, features and advantages of the present invention more apparent and understandable, specific embodiments of the present invention are described below.

According to detailed description of specific embodiments of the present invention with the combination of drawings, the above and other objects, advantages and features of the present invention will be better understood by those skilled in the art.

BRIEF DESCRIPTION OF THE DRAWINGS

Some specific embodiments of the present invention will be described later in detail in an exemplary and non-limiting manner with reference to the drawings. Identical reference numerals in the drawings indicate identical or similar components or parts. It shall be understood by those skilled in the art that these drawings are not necessarily drawn to scale. In the drawings.

DETAILED DESCRIPTION

Figure 1:
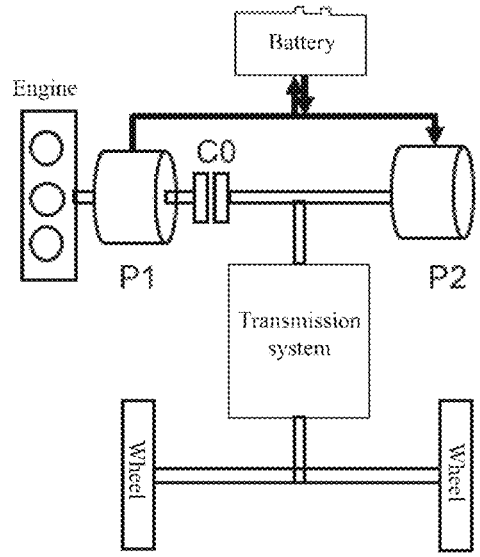
FIG. 1 shows a structural schematic diagram of a dual-motor hybrid power system in the prior art.

Exemplary embodiments of the present disclosure will be described in greater detail below with reference to the drawings. Although exemplary embodiments of the present disclosure are shown in the drawings, it shall be understood that the present disclosure can be implemented in various forms and shall not be limited by the embodiments elaborated herein. On the contrary, these embodiments are provided to enable a more thorough understanding of the present disclosure and to enable the complete scope of the present disclosure to be communicated to those skilled in the art.

Figure 2:
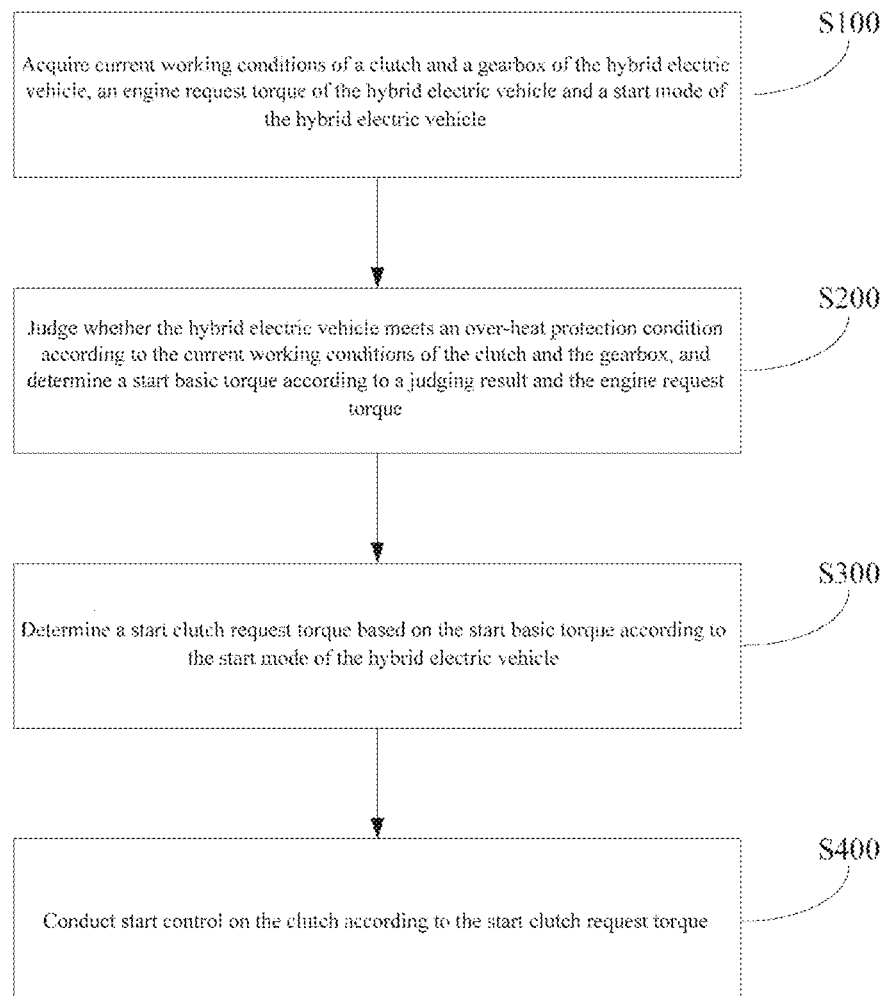
FIG. 2 shows a schematic flowchart of a parallel start control method for a hybrid electric vehicle according to an embodiment of the present invention.

FIG. 2 shows a schematic flowchart of a parallel start control method for a hybrid electric vehicle according to an embodiment of the present invention. As shown in FIG. 2, the parallel start control method for the hybrid electric vehicle includes the following steps:

step S100, current working conditions of a clutch and a gearbox of the hybrid electric vehicle, an engine request torque of the hybrid electric vehicle and a start mode of the hybrid electric vehicle are acquired;

step S200, whether the hybrid electric vehicle meets an over-heat protection condition is judged according to the current working conditions of the clutch and the gearbox, and a start basic torque is determined according to a judging result and the engine request torque;

step S300, a start clutch request torque is determined based on the start basic torque according to the start mode of the hybrid electric vehicle; and step S400, start control is conducted on the clutch according to the start clutch request torque.

According to the solution of the present invention, whether the hybrid electric vehicle meets the over-heat protection condition is judged according to the current working conditions of the clutch and the gearbox, the start basic torque is then determined according to the judging result and the engine request torque, the start clutch request torque is also determined based on the start basic torque according to the start mode of the hybrid electric vehicle, and thus an over-heat protection torque is considered in the process of start control on the clutch, and different start clutch request torques are available in different start modes, so that the start security of the hybrid electric vehicle is improved.

Specifically, the embodiments of the present invention further provide a parallel start control system for a hybrid electric vehicle, including a control device, the control device includes a memory and a processor, a control program is stored in the memory, and the control program is used to implement the parallel start control method for the hybrid electric vehicle when executed by the processor.

The embodiments of the present invention further provide a hybrid electric vehicle, including the parallel start control system for the hybrid electric vehicle.

Detailed description is made with specific embodiments below:

Embodiment I

In step S100, the clutch includes a completely engaged working condition, an incompletely engaged working condition and a disengaged working condition. The gearbox includes an in-gear working condition and an off-gear working condition. The start modes of the hybrid electric vehicle include an accelerator pedaling start mode, a neutral taxiing start mode and a launch control start mode. Entering conditions of each start mode are respectively:

1) The entering condition of the accelerator pedaling start mode is that the gearbox is in the in-gear working condition and a driver starts by pressing the accelerator pedal rather than launch control. A quitting condition is to put in neutral.
2) The entering condition of the neutral taxiing start mode is that the gearbox is in the in-gear working condition, the driver starts without pressing the accelerator pedal, a target rotation speed of the start without pressing the accelerator pedal is greater than a target idle rotation speed, and the vehicle is not in launch control start.
3) The entering condition of the launch control start mode is that an accelerator opening degree is >90%, a brake torque is >4000 Nm, and a vehicle speed is <1 km/h.

In specific implementation, after vehicle start meets certain conditions, the clutch can be locked to improve torque transmission efficiency, and the conditions are as follows:

1) A gearbox input shaft rotation speed is greater than 900 rpm; and
2) The absolute value of a difference between a target rotation speed of start and the gearbox input shaft rotation speed is smaller than 40 rpm. A calculation method of the target rotation speed of start is specifically described below.

A corresponding calculation method of the start clutch request torque is described in accordance with a clutch working condition and a gearbox working condition.

I. The clutch is in an incompletely engaged working condition and the gearbox is in the in-gear working condition.

In the working conditions, the step S200 includes: when it is determined that the hybrid electric vehicle meets the over-heat protection condition, a preset over-heat protection offset torque is subtracted from the engine request torque, to obtain the start basic torque; and when it is determined that the hybrid electric vehicle does not meet the over-heat protection condition, the engine request torque is taken as the start basic torque. The over-heat protection offset torque for example may be set as 50 Nm.

It is determined that the over-heat protection condition is met when the following conditions are met synchronously:

1) The temperature of the clutch is greater than or equal to 220° C., and the temperature of the gearbox is greater than or equal to 120° C.
2) The start mode of the hybrid electric vehicle is the accelerator pedaling start mode or launch control start mode.
3) A variation rate of the engine request torque is smaller than a first preset variation rate when a brake pedal of the hybrid electric vehicle is pressed, the variation rate of the engine request torque is smaller than a second preset variation rate when the brake pedal is not pressed, the first preset variation rate is smaller than the second preset variation rate, for example, the first preset variation rate is 10 Nm/s, and the second preset variation rate is 100 Nm/s.
4) A difference obtained by subtracting the engine request torque from a maximum engine torque limit corresponding to the current engine rotation speed of the hybrid electric vehicle is greater than a preset torque value, where the maximum engine torque limit is a maximum engine torque, which is determined by an universal characteristic diagram obtained through an engine bench test and is related to a rotation speed, and corresponding maximum torque limits at a rotation speed of 1500-5500 are different. In addition, the engine request torque is an engine request torque at a corresponding rotation speed. The preset torque value for example may be 30 Nm.
5) A current vehicle speed of the hybrid electric vehicle is smaller than or equal to a preset vehicle speed, and the preset vehicle speed for example may be 3 km/h.

Specific implementation steps in the step S300 are determined below according to the start mode of the hybrid electric vehicle.

1. The start mode of the hybrid electric vehicle is the accelerator pedaling start mode.

Figure 3:
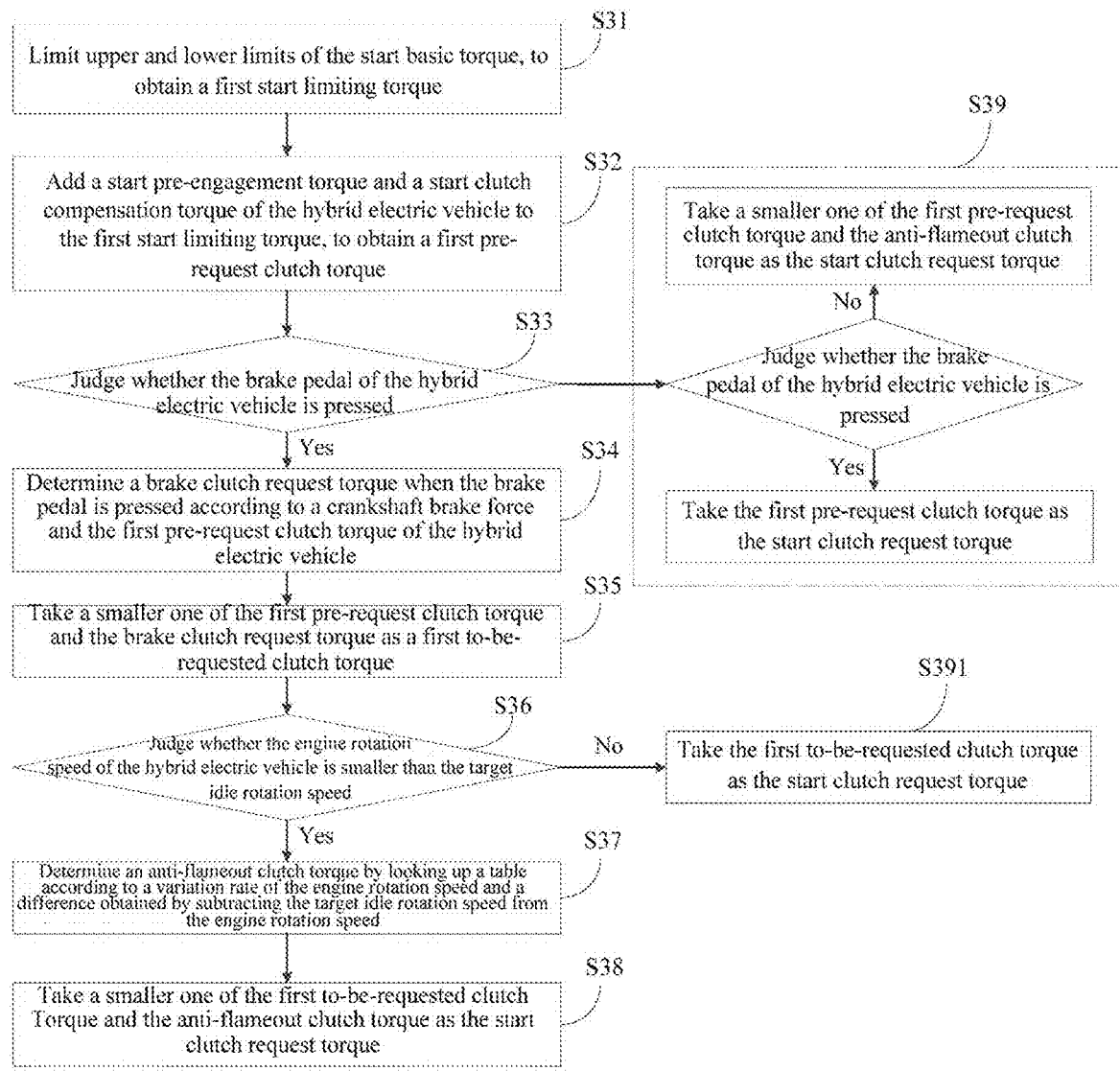
FIG. 3 shows a schematic flowchart of a method for determining a start clutch request torque in an accelerator pedaling start mode according to an embodiment I of the present invention.

In this start mode, as shown in FIG. 3, the step S300 includes:

step S31, upper and lower limits of the start basic torque are limited, to obtain a first start limiting torque;

step S32, a start pre-engagement torque and a start clutch compensation torque of the hybrid electric vehicle are added to the first start limiting torque, to obtain a first pre-request clutch torque;

step S33, whether the brake pedal of the hybrid electric vehicle is pressed is judged, if so, steps S34 to S38 are implemented in sequence, and if not, step S39 is implemented.

step S34, a brake clutch request torque when the brake pedal is pressed is determined according to a crankshaft brake force and the first pre-request clutch torque of the hybrid electric vehicle;

step S35, a smaller one of the first pre-request clutch torque and the brake clutch request torque is taken as a first to-be-requested clutch torque;

step S36, whether the engine rotation speed of the hybrid electric vehicle is smaller than the target idle rotation speed is judged, if so, steps S37 to S38 are implemented in sequence, and if not, step S391 is implemented;

step S37, an anti-flameout clutch torque is determined by looking up a table according to a variation rate of the engine rotation speed and a difference obtained by subtracting the target idle rotation speed from the engine rotation speed;

step S38, a smaller one of the first to-be-requested clutch torque and the anti-flameout clutch torque is taken as the start clutch request torque;

step S39, whether the engine rotation speed is greater than or equal to the target idle rotation speed is judged, if so, the first pre-request clutch torque is taken as the start clutch request torque, and if not, a smaller one of the first pre-request clutch torque and the anti-flameout clutch torque is taken as the start clutch request torque; and step S391, the first to-be-requested clutch torque is taken as the start clutch request torque.

In step S31, that the upper and lower limits of the start basic torque are limited refers to confine the start basic torque between an engine maximum torque and a minimum torque.

In step S32, the start pre-engagement torque is determined by: acquiring a current vehicle speed of the hybrid electric vehicle and searching the first preset mapping relationship table storing the relationship between the vehicle speed and the start pre-engagement torque, to determine the start pre-engagement torque corresponding to the current vehicle speed. The first preset mapping relationship table is an experience table, which, for example, may be shown in the Table 1 below:

TABLE 1

| Current vehicle speed (km/h) | 0 | 2 | 4 | 6 |
|---|---|---|---|---|
| Start pre-engagement torque (Nm) | 3 | 2 | 1 | 0 |

Figure 4:
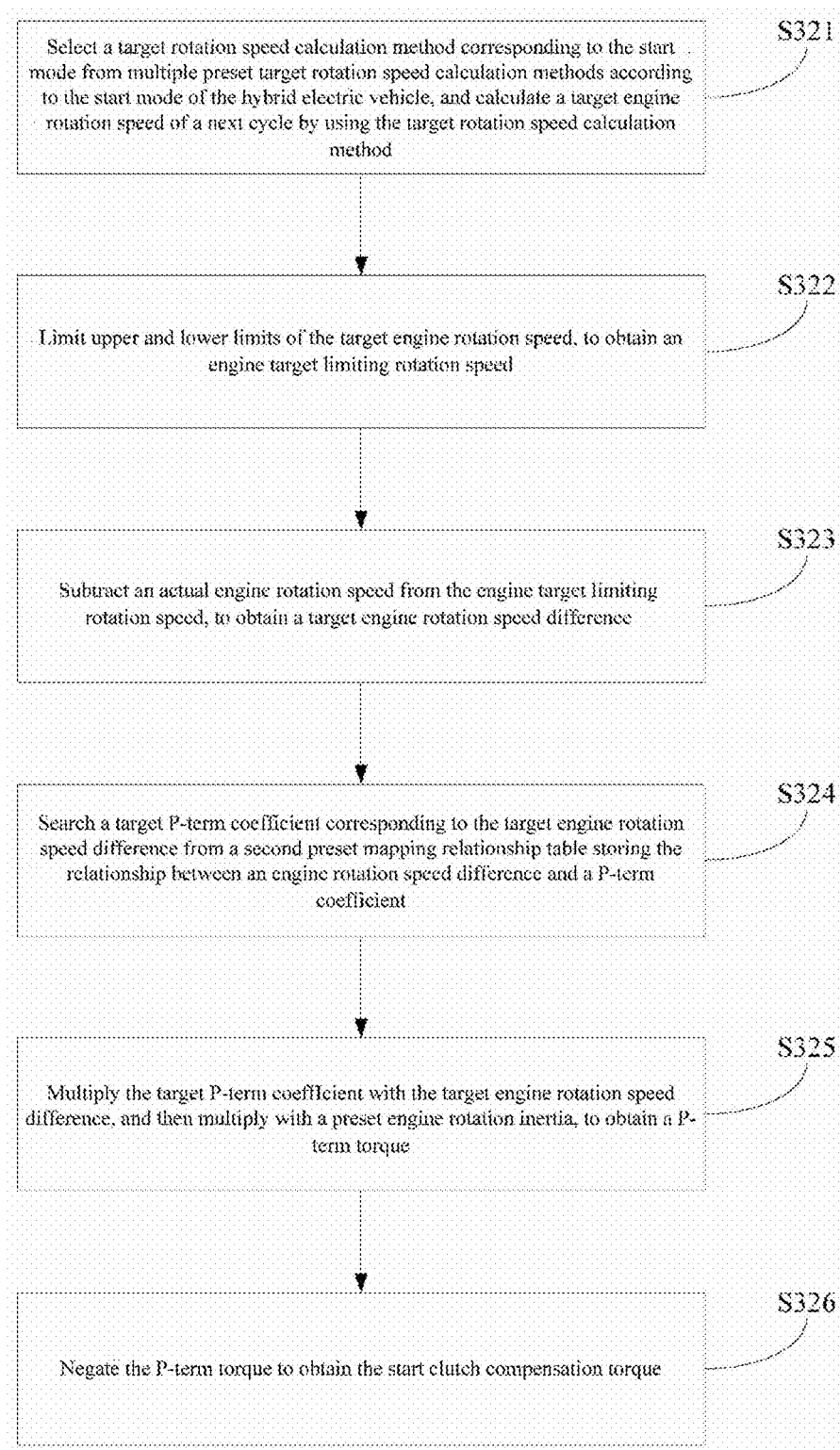
FIG. 4 shows a schematic flowchart of an acquisition method of a start clutch compensation torque according to the embodiment I of the present invention.

FIG. 4 shows a schematic flowchart of an acquisition method of a start clutch compensation torque according to the embodiment I of the present invention. As shown in FIG. 4, the acquisition method includes:

step S321, a target rotation speed calculation method corresponding to the start mode is selected from multiple preset target rotation speed calculation methods according to the start mode of the hybrid electric vehicle, and a target engine rotation speed of a next cycle is calculated by using the target rotation speed calculation method;

step S322, upper and lower limits of the target engine rotation speed are limited, to obtain an engine target limiting rotation speed;

step S323, an actual engine rotation speed is subtracted from the engine target limiting rotation speed, to obtain a target engine rotation speed difference;

step S324, a target P-term coefficient corresponding to the target engine rotation speed difference is searched from a second preset mapping relationship table storing the relationship between an engine rotation speed difference and a P-term coefficient;

step S325, the target P-term coefficient is multiplied with the target engine rotation speed difference, and then multiplied with a preset engine rotation inertia, to obtain a P-term torque; and step S326, the P-term torque is negated to obtain the start clutch compensation torque.

Figure 5:
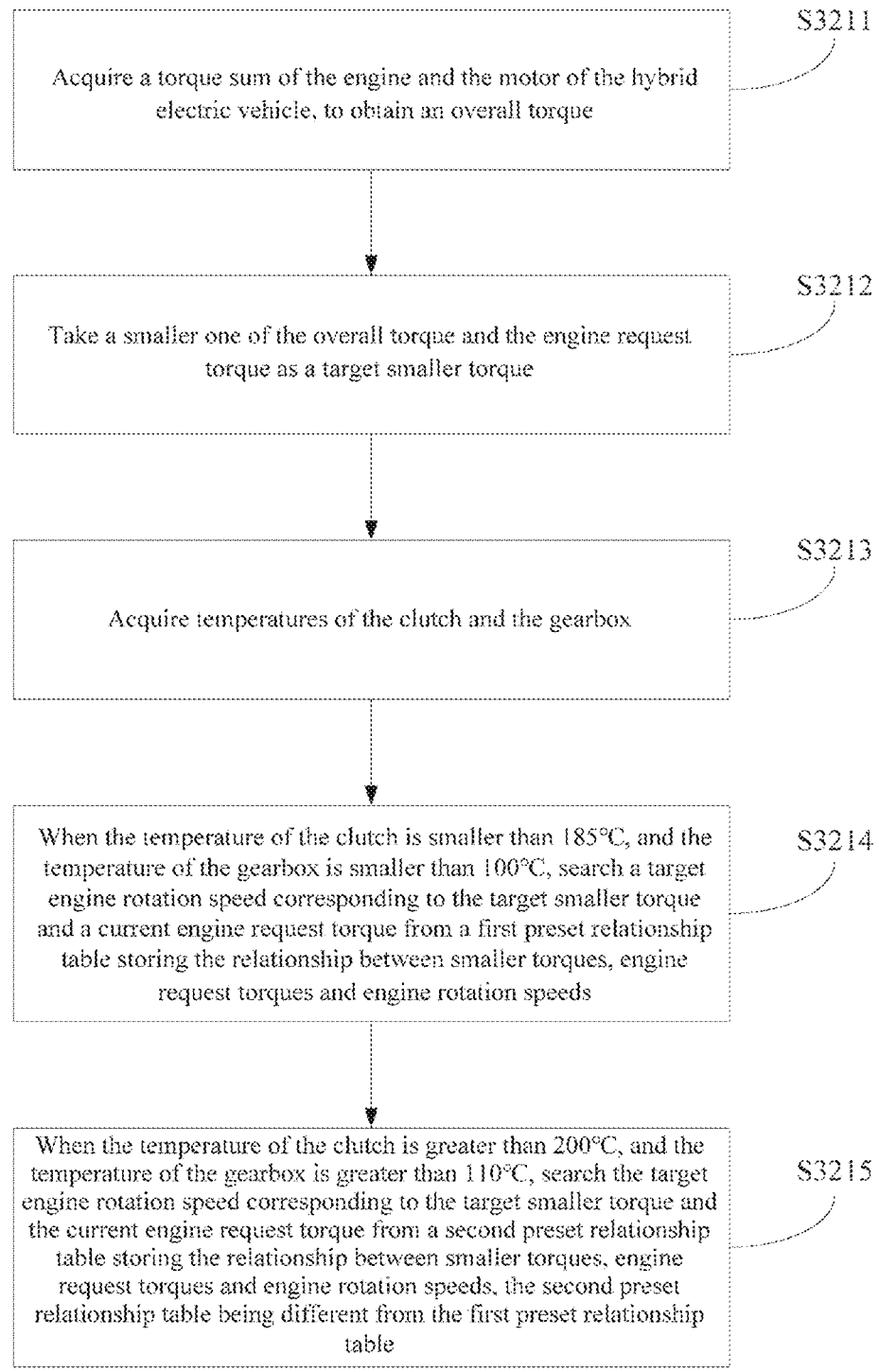
FIG. 5 shows a schematic flowchart of a first target rotation speed calculation method according to the embodiment I of the present invention.

In the step S321, when the start mode is the accelerator pedaling start mode or launch control start mode, a first target rotation speed calculation method is selected to calculate the target engine rotation speed, and as shown in FIG. 5, the first target rotation speed calculation method includes:

step 3211, a torque sum of the engine and the motor of the hybrid electric vehicle is acquired, to obtain an overall torque;

step 3212, a smaller one of the overall torque and the engine request torque is taken as a target smaller torque;

step 3213, temperatures of the clutch and the gearbox are acquired;

step 3214, when the temperature of the clutch is smaller than 185° C., and the temperature of the gearbox is smaller than 100° C., a target engine rotation speed corresponding to the target smaller torque and a current engine request torque is searched from a first preset relationship table storing the relationship between smaller torques, engine request torques and engine rotation speeds; and step 3215, when the temperature of the clutch is greater than 200° ° C., and the temperature of the gearbox is greater than 110° C., the target engine rotation speed corresponding to the target smaller torque and the current engine request torque is searched from a second preset relationship table storing the relationship between smaller torques, engine request torques and engine rotation speeds, wherein the second preset relationship table is different from the first preset relationship table.

In the step S3212, the engine request torque is a filtered crankshaft torque. In the step S3214, the first preset relationship table, for example, may be a Table 2 below:

TABLE 2

| | y | | | | | | | | | | |
|---|---|---|---|---|---|---|---|---|---|---|---|
| x | 0 | 1125 | 1250 | 1500 | 1750 | 2000 | 2250 | 2375 | 2500 | 3300 | 7000 |
| 10 | 900 | 1125 | 1250 | 1500 | 1750 | 2000 | 2250 | 2375 | 2500 | 3300 | 7000 |
| 25 | 1100 | 1300 | 1375 | 1500 | 1750 | 2000 | 2250 | 2375 | 2500 | 3300 | 7000 |
| 50 | 1600 | 1600 | 1600 | 1600 | 1800 | 2000 | 2250 | 2375 | 2500 | 3300 | 7000 |
| 100 | 1600 | 1600 | 1600 | 1600 | 1800 | 2000 | 2250 | 2375 | 2500 | 3300 | 7000 |
| 150 | 1800 | 1800 | 1800 | 1800 | 1800 | 2000 | 2250 | 2375 | 2500 | 3300 | 7000 |
| 200 | 1800 | 1800 | 1800 | 1800 | 1800 | 2000 | 2250 | 2375 | 2500 | 3300 | 7000 |
| 250 | 1800 | 1800 | 1800 | 1800 | 1800 | 2000 | 2250 | 2375 | 2500 | 3300 | 7000 |

In the Table 2, x represents a smaller torque, y represents an engine rotation speed, and a value determined by x and y together is an engine request torque. The target smaller torque is one of values of smaller torques.

In the step S3215, the second preset relationship table, for example, may be a Table 3 below:

TABLE 3

| | y | | | | | | | |
|---|---|---|---|---|---|---|---|---|
| x | 0 | 1150 | 1500 | 1750 | 2000 | 2500 | 3800 | 7000 |
| 50 | 950 | 1150 | 1500 | 1750 | 2000 | 2500 | 3800 | 7000 |
| 100 | 1050 | 1425 | 1500 | 1750 | 2000 | 2500 | 3800 | 7000 |
| 150 | 1150 | 1441 | 1500 | 1750 | 2000 | 2500 | 3800 | 7000 |
| 200 | 1250 | 1458 | 1500 | 1750 | 2000 | 2500 | 3800 | 7000 |
| 250 | 1350 | 1475 | 1500 | 1750 | 2000 | 2500 | 3800 | 7000 |
| 300 | 1450 | 1491 | 1500 | 1750 | 2000 | 2500 | 3800 | 7000 |
| 330 | 1450 | 1491 | 1500 | 1750 | 2000 | 2500 | 3800 | 7000 |

In the Table 3, x represents a smaller torque, y represents an engine rotation speed, and a value determined by x and y together is an engine request torque. The target smaller torque is one of values of smaller torques.

Data setup in the first preset relationship table and the second preset relationship table can avoid an engine overheat phenomenon.

Figure 6:
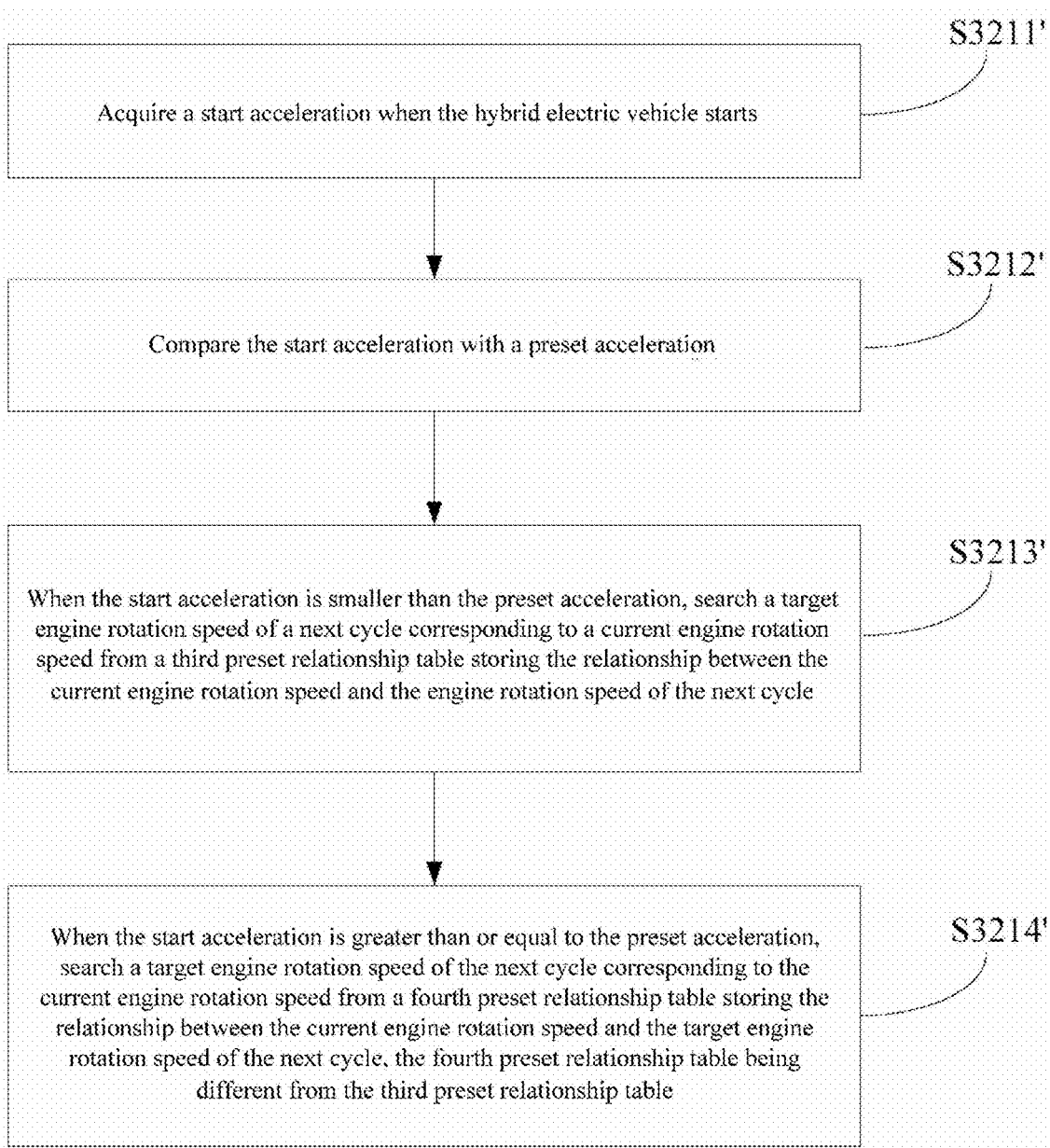
FIG. 6 shows a schematic flowchart of a second target rotation speed calculation method according to the embodiment I of the present invention.

In step S321, when the start mode is the neutral taxiing start mode, a second target rotation speed calculation method is selected to calculate the target engine rotation speed, and as shown in FIG. 6, the second target rotation speed calculation method includes:

S3211', a start acceleration when the hybrid electric vehicle starts is acquired;

S3212', the start acceleration is compared with a preset acceleration;

S3213', when the start acceleration is smaller than the preset acceleration, a target engine rotation speed of a next cycle corresponding to a current engine rotation speed is searched from a third preset relationship table storing the relationship between the current engine rotation speed and the engine rotation speed of the next cycle; and S3214', when the start acceleration is greater than or equal to the preset acceleration, a target engine rotation speed of the next cycle corresponding to the current engine rotation speed is searched from a fourth preset relationship table storing the relationship between the current engine rotation speed and the target engine rotation speed of the next cycle, wherein the fourth preset relationship table is different from the third preset relationship table.

In step S3212', the preset acceleration for example may be 0.3 m/s². To avoid too rapid decrease of the engine rotation speed to be lower than the engine rotation speed, a target engine rotation speed of a next cycle is set to be slightly higher than a current engine rotation speed, such as 50 rpm. The third preset relationship table, for example, may be a Table 4 below:

TABLE 4

| | Current engine rotation speed | | | | | | | |
|---|---|---|---|---|---|---|---|---|
| | 100 | 950 | 1050 | 1200 | 1300 | 1600 | 1750 | 7000 |
| Target engine rotation speed of the next cycle | 150 | 1000 | 1100 | 1250 | 1350 | 1650 | 1750 | 7000 |

The unit of the engine rotation speed in Table 4 is rpm.

In the step S3214', the fourth preset relationship table, for example, may be a Table 5 below:

TABLE 5

| | Current engine rotation speed | | | | | | | |
|---|---|---|---|---|---|---|---|---|
| | 100 | 1000 | 1050 | 1200 | 1300 | 1400 | 1500 | 7000 |
| Target engine rotation speed of the next cycle | 100 | 1000 | 1050 | 1200 | 1300 | 1400 | 1500 | 7000 |

The unit of the engine rotation speed in Table 5 is rpm.

In the step S322, the upper and lower limits of the target engine rotation speed are limited, wherein the upper limit is an engine rotation speed added with a rotation speed compensation quantity based on a vehicle speed, and when the vehicle speed exceeds a certain value, the rotation speed compensation quantity may be zero. A table that the current vehicle speed and the upper limit of the target engine rotation speed are met, for example, may be shown in Table 6 below:

TABLE 6

| x | 10 | 15 | 30 | 35 |
|---|---|---|---|---|
| x | 3000 | 1500 | 1000 | 0 |

In the Table 6, x represents the current vehicle speed, in km/h, and y represents the target engine rotation speed, in rpm.

The upper and lower limits of the target engine rotation speed are limited, wherein the lower limit is a greater one of the engine rotation speed and the target idle rotation speed (that is, the vehicle is put at the gear P, and the engine rotation speed is 900-1200).

In the step S324, when the start of the vehicle is activated, the start engine compensation torque is equal to the P-term torque, and is equal to $-1*$ start clutch compensation torque. When the vehicle is not at start activation, the start clutch compensation torque gradually changes to zero at a certain rate, and the certain rate, for example, may be 5 Nm/s. The second preset mapping relationship table, for example, may be a Table 7 below:

TABLE 7

| | Target engine rotation speed difference | | | | | | | | |
|---|---|---|---|---|---|---|---|---|---|
| | −500 | −250 | −100 | −50 | 0 | 50 | 100 | 250 | 500 |
| P-term torque | 0.2 | 0.2 | 0.2 | 0.2 | 0.2 | 0.4 | 0.5 | 0.5 | 0.5 |

When the engine target limiting rotation speed is greater than the actual engine rotation speed, the P-term torque is positive, at the moment, the engine torque needs to increase, and the clutch torque needs to decrease, therefore, the start clutch compensation torque needs to be negated when calculated, and the start engine compensation torque is equal to the P-term torque.

In step S34, the brake clutch request torque is determined by searching a relationship table storing the relationship among a crankshaft brake force, a first pre-request clutch torque and a brake clutch request torque. The relationship table is an experience table, which for example may be the Table 8 below:

TABLE 8

| | x | | | | |
|---|---|---|---|---|---|
| y | 0 | 50 | 100 | 200 | 400 |
| 0 | 0 | 0 | 0 | 0 | 0 |
| 50 | 60 | 0 | 0 | 0 | 0 |
| 100 | 110 | 50 | 0 | 0 | 0 |
| 400 | 410 | 350 | 300 | 200 | 0 |

In the Table 8, x represents the crankshaft brake force, y represents the first pre-request clutch torque, and the value determined by x and y together is a brake clutch request torque. Therefore, the method of the present invention considers a brake pedal pressing situation in the start process.

In the step S37, the anti-flameout clutch torque is determined by searching a relationship table storing the relationship among the variation rate of the engine rotation speed, the difference obtained by subtracting the target idle rotation speed from the engine rotation speed, and the anti-flameout clutch torque, and the relationship table, for example, may be the Table 9 below:

TABLE 9

| x | y | | | | | | | |
|---|---|---|---|---|---|---|---|---|
|  | −450 | −250 | −150 | −50 | 0 | 200 | 500 | 1000 |
| −1000 | 0 | 0 | 0 | 100 | 150 | 300 | 500 | 500 |
| −500 | 0 | 0 | 50 | 100 | 150 | 300 | 500 | 500 |
| 0 | 0 | 0 | 100 | 100 | 150 | 300 | 500 | 500 |
| 500 | 0 | 0 | 100 | 100 | 150 | 300 | 500 | 500 |
| 1000 | 0 | 0 | 100 | 100 | 150 | 300 | 500 | 500 |

In the Table 9, x represents the variation rate of the engine rotation speed, y represents the difference obtained by subtracting the target idle rotation speed from the engine rotation speed, and a value determined by x and y together is the anti-flameout clutch torque. Therefore, in the solution of the present invention, an anti-flameout protection function is added. When the engine rotation speed is smaller than the target idle rotation speed, the clutch torque shall decrease to prevent the engine from being dragged to flame out, thereby avoiding the engine flameout situation in the start process.

2. The start mode of the hybrid electric vehicle is the neutral taxiing start mode.

Figure 7:
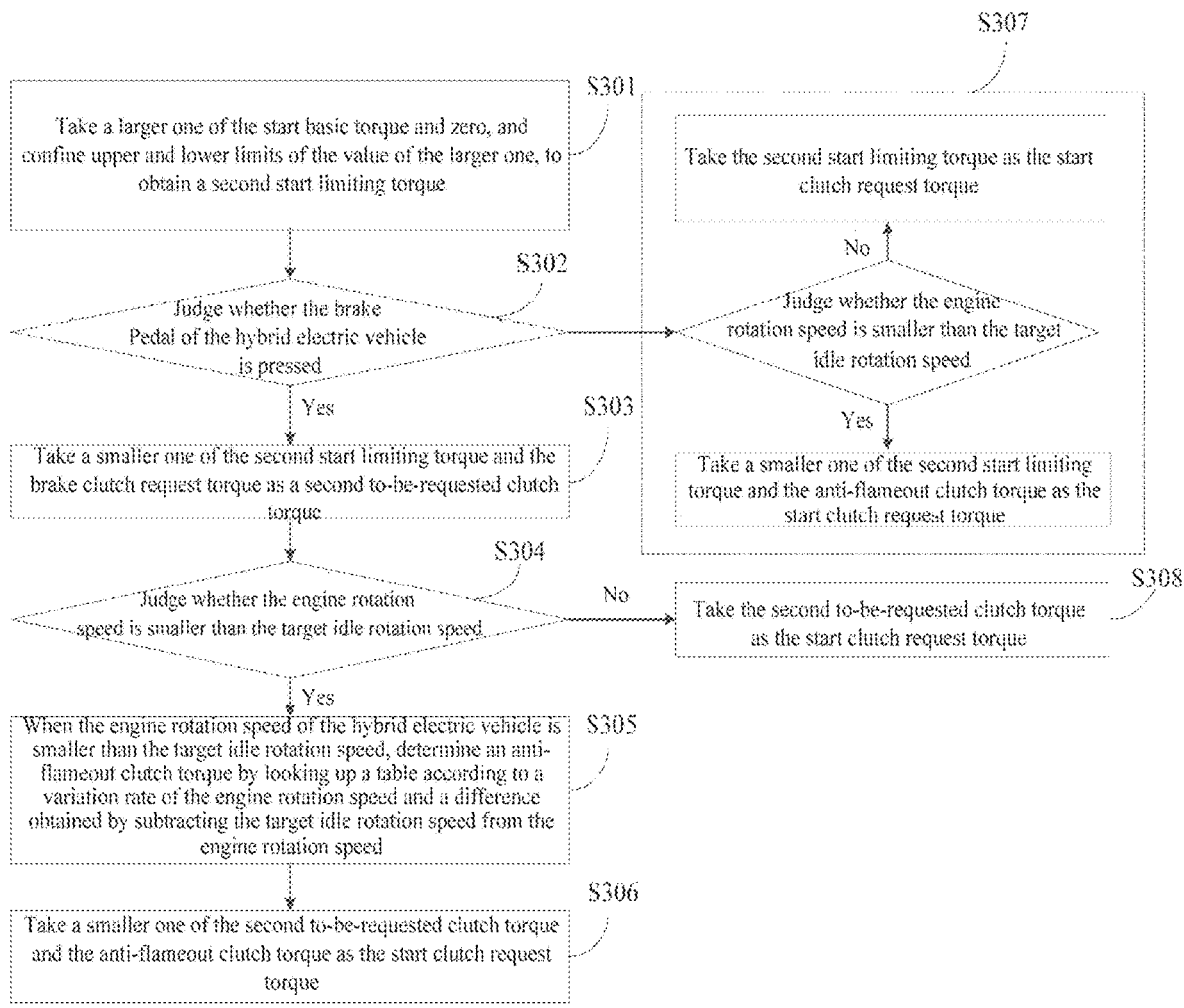
FIG. 7 shows a schematic flowchart of a method for determining a start clutch request torque in a neutral taxiing start mode according to the embodiment I of the present invention.

In this start mode, as shown in FIG. 7, the step S300 includes:

step S301, a larger one of the start basic torque and zero is taken, and upper and lower limits of the value of the larger one are limited, to obtain a second start limiting torque;

step S302, whether the brake pedal of the hybrid electric vehicle is pressed is judged, if so, steps S303 to S306 are implemented in sequence, and if not, step S307 is implemented;

step S303, a smaller one of the second start limiting torque and the brake clutch request torque is taken as a second to-be-requested clutch torque;

step S304, whether the engine rotation speed is smaller than the target idle rotation speed is judged, if so, steps S305 to S306 are implemented in sequence, and if not, step S308 is implemented;

step S305, when the engine rotation speed of the hybrid electric vehicle is smaller than the target idle rotation speed, an anti-flameout clutch torque is determined by looking up a table according to a variation rate of the engine rotation speed and a difference obtained by subtracting the target idle rotation speed from the engine rotation speed;

step S306, a smaller one of the second to-be-requested clutch torque and the anti-flameout clutch torque is taken as the start clutch request torque;

step S307, whether the engine rotation speed is smaller than the target idle rotation speed is judged, if so, a smaller one of the second start limiting torque and the anti-flameout clutch torque is taken as the start clutch request torque, and if not, the second start limiting torque is taken as the start clutch request torque; and step S308, the second to-be-requested clutch torque is taken as the start clutch request torque.

In the step S301, the purpose of taking the larger one of the start basic torque and zero is to prevent the clutch torque from dropping to a negative value resulting in complete disengagement.

In the steps S301 to S307, the calculation methods for the start basic torque, the brake clutch request torque, the anti-flameout clutch torque and the like are kept accordant with the calculation methods of corresponding torques in case that the start mode of the hybrid electric vehicle is the accelerator pedaling start mode, which are not repeatedly described here.

3. The start mode of the hybrid electric vehicle is the launch control start mode.

Figure 8:
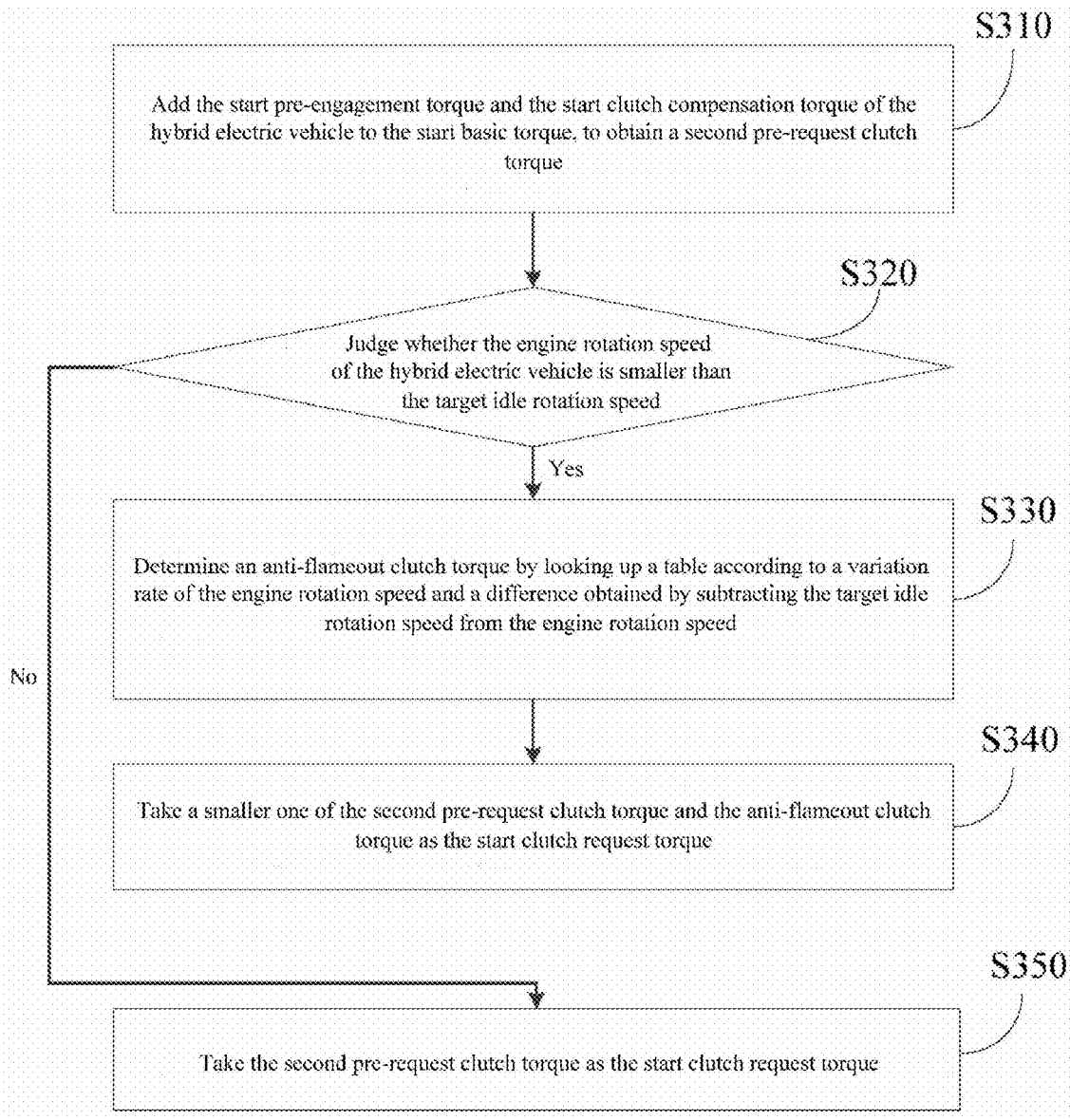
FIG. 8 shows a schematic flowchart of a method for determining a start clutch request torque in a launch control start mode according to the embodiment I of the present invention.

In this start mode, as shown in FIG. 8, the step S300 includes:

step S310, the start pre-engagement torque and the start clutch compensation torque of the hybrid electric vehicle are added to the start basic torque, to obtain a second pre-request clutch torque;

step S320, whether the engine rotation speed of the hybrid electric vehicle is smaller than the target idle rotation speed is judged, if so, the steps S330 to S340 are implemented in sequence, and if not, the step S350 is implemented;

step S330, an anti-flameout clutch torque is determined by looking up a table according to a variation rate of the engine rotation speed and a difference obtained by subtracting the target idle rotation speed from the engine rotation speed;

step S340, a smaller one of the second pre-request clutch torque and the anti-flameout clutch torque is taken as the start clutch request torque; and step S350, the second pre-request clutch torque is taken as the start clutch request torque.

In the steps S310 to S340, the calculation methods for the start basic torque, the start pre-engagement torque, the start clutch compensation torque, the anti-flameout clutch torque and the like are kept accordant with the calculation methods of corresponding torques in case that the start mode of the hybrid electric vehicle is the accelerator pedaling start mode, which are not repeatedly described here.

II. The Clutch is in the Completely Engaged Working Condition

In the working condition, the step S200 and the step S300 include: whether the hybrid electric vehicle meets the over-heat protection condition is determined; when it is determined that the hybrid electric vehicle meets the over-heat protection condition, a preset over-heat protection offset torque is subtracted from the engine request torque, to obtain the start basic torque, and the start basic torque is taken as the start clutch request torque; and when the hybrid electric vehicle does not meet the over-heat protection condition, the engine request torque is taken as the start clutch request torque.

The over-heat protection condition is kept accordant with that the clutch is in the incompletely engaged working condition and the gearbox is in the in-gear working condition, which is not repeatedly described here.

III. The Clutch is in the Incompletely Engaged Working Condition and the Gearbox is in the Off-Gear Working Condition In the working condition, it is determined that the start clutch request clutch is equal to zero.

According to the solution of the embodiment of the present invention, multiple start control modes are set in the start process, specifically the neutral taxiing start mode, the launch control start mode and the accelerator pedaling start mode, an over-heat working condition and a brake pedal pressing working condition are both processed in each start mode, and meanwhile, an anti-flameout protection is also added, so that the power performance and the security of the system are improved, and start response is also improved.

The parallel start control system for the hybrid electric vehicle in the embodiment has characteristics in one-to-one correspondence with the parallel start control method for the hybrid electric vehicle, which is not repeatedly described here.

The hybrid electric vehicle in the embodiment has characteristics in one-to-one correspondence with the parallel start control system for hybrid electric vehicle, which is not repeatedly described here.

Embodiment II

The difference between the embodiment II and the embodiment I lies in that the embodiment II further conducts start control on the engine, and a specific control method for conducting start control on the engine is described in detail.

Figure 9:
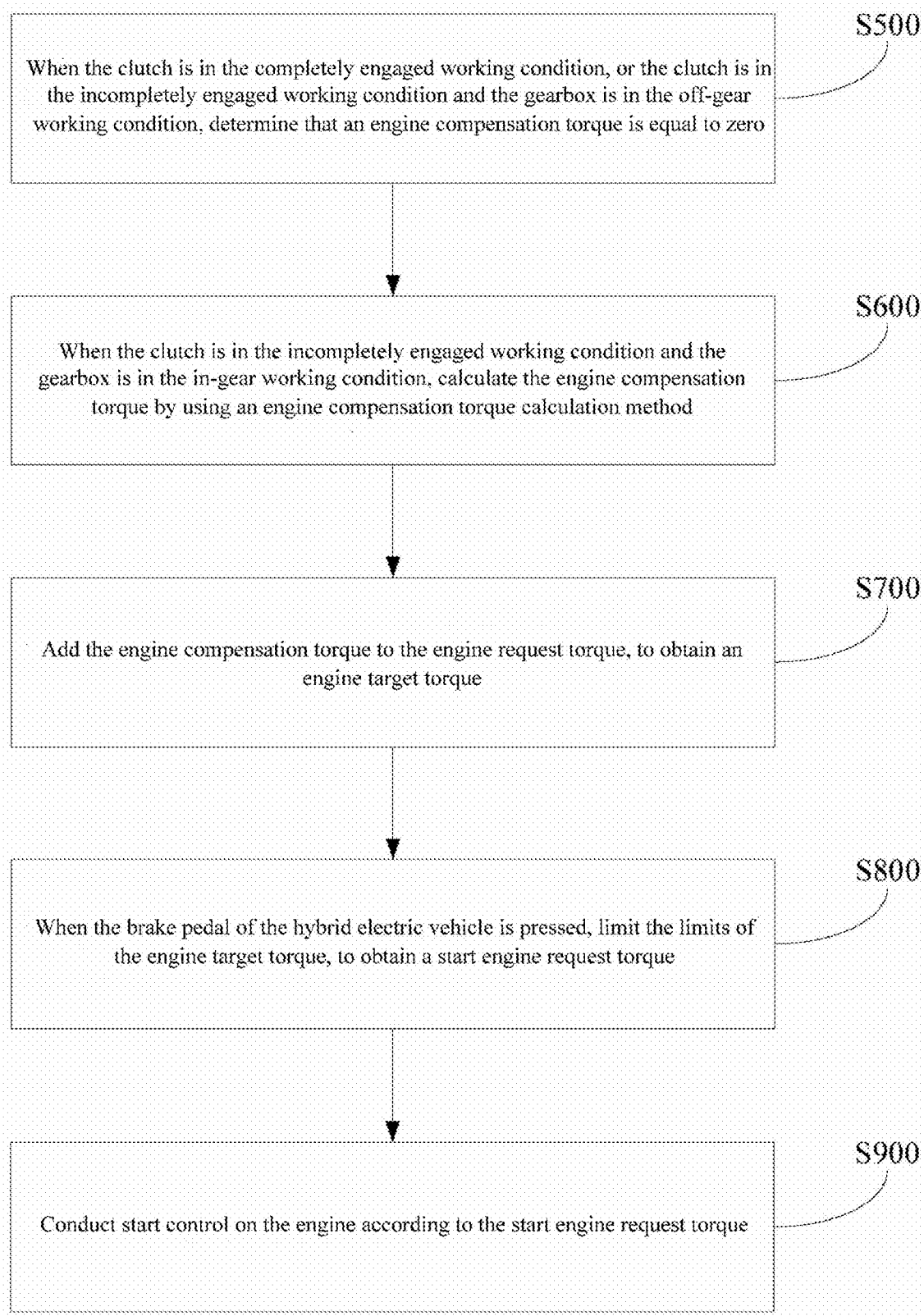
FIG. 9 shows a schematic flowchart of conducting start control on an engine in a parallel start control method for a hybrid electric vehicle according to an embodiment II of the present invention.

As shown in FIG. 9, the parallel start control method for the hybrid electric vehicle further includes:

step S500, when the clutch is in the completely engaged working condition, or the clutch is in the incompletely engaged working condition and the gearbox is in the off-gear working condition, it is determined that an engine compensation torque is equal to zero;

step S600, when the clutch is in the incompletely engaged working condition and the gearbox is in the in-gear working condition, the engine compensation torque is calculated by using an engine compensation torque calculation method;

step S700, the engine compensation torque is added to the engine request torque, to obtain an engine target torque;

step S800, when the brake pedal of the hybrid electric vehicle is pressed, the limits of the engine target torque is limited, to obtain a start engine request torque; and step S900, start control on the engine is conducted according to the start engine request torque.

Figure 10:
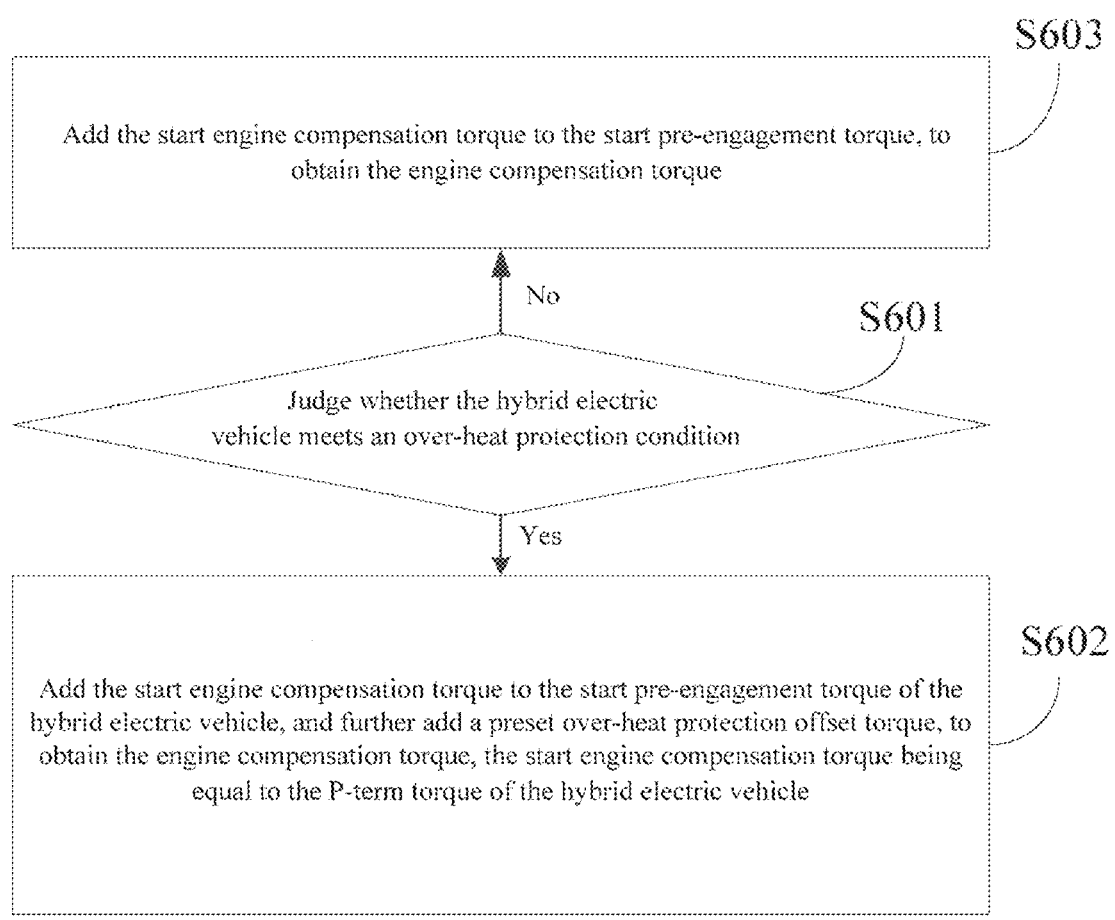
FIG. 10 shows a schematic flowchart of a calculation method for an engine compensation torque according to the embodiment II of the present invention.

As shown in FIG. 10, in the step S600, the engine compensation calculation method includes:

step S601, whether the hybrid electric vehicle meets an over-heat protection condition is judged, if so, step S602 is implemented, and if not, S603 is implemented;

step S602, the start engine compensation torque is added to the start pre-engagement torque of the hybrid electric vehicle, and a preset over-heat protection offset torque is further added, to obtain the engine compensation torque, wherein the start engine compensation torque is equal to the P-term torque of the hybrid electric vehicle; and step S603, the start engine compensation torque is added to the start pre-engagement torque, to obtain the engine compensation torque.

In step S800, the method of limiting the limit of the engine target torque includes: when the brake pedal of the hybrid electric vehicle is pressed, a brake clutch request torque when the brake pedal is pressed is determined; and a smaller one of the engine target torque and the brake engine request torque is taken, to obtain the start engine request torque.

In the steps S602 and S603, the calculation methods for the start engine compensation torque, the start pre-engagement torque and the like are accordant with the calculation methods of corresponding torques in embodiment I, which are not repeatedly described here.

The parallel start control system for the hybrid electric vehicle in the embodiment has characteristics in one-to-one correspondence with the parallel start control method for the hybrid electric vehicle, which is not repeatedly described here.

The hybrid electric vehicle in the embodiment has characteristics in one-to-one correspondence with the parallel start control system for the hybrid electric vehicle, which is not repeatedly described here.

According to the solution of the embodiment of the present invention, by controlling the engine torque, engine flameout can be further avoided, and the responsiveness, power performance and security in the start process can be further improved.

At this point, it shall be recognized by those skilled in the art that although exemplary embodiments of the present invention have been exhaustively shown and described herein, many other variations or modifications consistent with principles of the present invention can be directly identified or deduced from the present disclosure of the present invention without departing from the spirit and scope of the present invention. Therefore, the scope of the present invention shall be understood and affirmed as covering all these variations or modifications.

What is claimed is:

1. A parallel start control method for a hybrid electric vehicle, comprising the following steps:

acquiring current working conditions of a clutch and a gearbox of the hybrid electric vehicle, an engine request torque of the hybrid electric vehicle and a start mode of the hybrid electric vehicle;

judging whether the hybrid electric vehicle meets an over-heat protection condition according to the current working conditions of the clutch and the gearbox, and determining a start basic torque according to a judging result and the engine request torque;

determining a start clutch request torque based on the start basic torque according to the start mode of the hybrid electric vehicle; and conducting start control on the clutch according to the start clutch request torque.

2. The parallel start control method for the hybrid electric vehicle according to claim 1, wherein the step of judging whether the hybrid electric vehicle meets the over-heat protection condition according to the current working conditions of the clutch and the gearbox, and determining the start basic torque according to the judging result and the engine request torque comprises:

when the clutch is in an incompletely engaged working condition and the gearbox is in an in-gear working condition, judging whether the hybrid electric vehicle meets the over-heat protection condition; and when determining that the hybrid electric vehicle meets the over-heat protection condition, subtracting a preset over-heat protection offset torque from the engine request torque, to obtain the start basic torque.

3. The parallel start control method for the hybrid electric vehicle according to claim 2, wherein when the start mode of the hybrid electric vehicle is an accelerator pedaling start mode, the step of determining the start clutch request torque based on the start basic torque according to the start mode of the hybrid electric vehicle comprises:

limiting upper and lower limits of the start basic torque, to obtain a first start limiting torque;

adding a start pre-engagement torque and a start clutch compensation torque of the hybrid electric vehicle to the first start limiting torque, to obtain a first pre-request clutch torque;

when a brake pedal of the hybrid electric vehicle is pressed, determining a brake clutch request torque when the brake pedal is pressed according to a crankshaft brake force and the first pre-request clutch torque of the hybrid electric vehicle;

taking a smaller one of the first pre-request clutch torque and the brake clutch request torque as a first to-be-requested clutch torque;

when an engine rotation speed of the hybrid electric vehicle is smaller than a target idle rotation speed, determining an anti-flameout clutch torque by looking up a table according to a variation rate of the engine rotation speed and a difference obtained by subtracting the target idle rotation speed from the engine rotation speed; and taking a smaller one of the first to-be-requested clutch torque and the anti-flameout clutch torque as the start clutch request torque.

4. The parallel start control method for the hybrid electric vehicle according to claim 3, wherein the step of determining the start clutch request torque based on the start basic torque according to the start mode of the hybrid electric vehicle further comprises:

when the brake pedal of the hybrid electric vehicle is not pressed, and the engine rotation speed is greater than or equal to the target idle rotation speed, taking the first pre-request clutch torque as the start clutch request torque;

when the brake pedal of the hybrid electric vehicle is not pressed, and the engine rotation speed is smaller than the target idle rotation speed, taking a smaller one of the first pre-request clutch torque and the anti-flameout clutch torque as the start clutch request torque; and when the brake pedal of the hybrid electric vehicle is pressed, and the engine rotation speed is greater than or equal to the target idle rotation speed, taking the first to-be-requested clutch torque as the start clutch request torque.

5. The parallel start control method for the hybrid electric vehicle according to claim 3, wherein the start clutch compensation torque is acquired by:

selecting a target rotation speed calculation method corresponding to the start mode from multiple preset target rotation speed calculation methods according to the start mode of the hybrid electric vehicle, and calculating a target engine rotation speed of a next cycle by using the target rotation speed calculation method;

limiting upper and lower limits of the target engine rotation speed, to obtain an engine target limiting rotation speed;

subtracting an actual engine rotation speed from the engine target limiting rotation speed, to obtain a target engine rotation speed difference;

searching a target P-term coefficient corresponding to the target engine rotation speed difference from a second preset mapping relationship table storing a relationship between an engine rotation speed difference and a P-term coefficient;

multiplying the target P-term coefficient with the target engine rotation speed difference, and then multiplying with a preset engine rotation inertia, to obtain a P-term torque; and negating the P-term torque to obtain the start clutch compensation torque.

6. The parallel start control method for the hybrid electric vehicle according to claim 5, wherein the step of selecting the target rotation speed calculation method corresponding to the start mode from multiple preset target rotation speed calculation methods according to the start mode of the hybrid electric vehicle, and calculating the target engine rotation speed of the next cycle by using the target rotation speed calculation method comprises: when the start mode of the hybrid electric vehicle is the accelerator pedaling start mode or the launch control start mode, selecting a first target engine rotation speed calculation method to calculate the target engine rotation speed, the first target engine rotation speed calculation method comprising the following steps:

acquiring a torque sum of the engine and motor of the hybrid electric vehicle, to obtain an overall torque;

taking a smaller one of the overall torque and the engine request torque, to obtain a target smaller torque;

acquiring temperatures of the clutch and the gearbox;

when the temperature of the clutch is smaller than 185° C., and the temperature of the gearbox is smaller than 100° C., searching a target engine rotation speed corresponding to the target smaller torque and a current engine request torque from a first preset relationship table storing the relationship between smaller torques, engine request torques and engine rotation speeds; and when the temperature of the clutch is greater than 200° C., and the temperature of the gearbox is greater than 110° C., searching the target engine rotation speed corresponding to the target smaller torque and the current engine request torque from a second preset relationship table storing the relationship between smaller torques, engine request torques and engine rotation speeds, wherein the second preset relationship table is different from the first preset relationship table.

7. The parallel start control method for the hybrid electric vehicle according to claim 5, wherein the step of selecting the target rotation speed calculation method corresponding to the start mode from multiple preset target rotation speed calculation methods according to the start mode of the hybrid electric vehicle, and calculating the target engine rotation speed of the next cycle by using the first target rotation speed calculation method comprises: when the start mode of the hybrid electric vehicle is the neutral taxiing start mode, selecting a second target engine rotation speed calculation method to calculate the target engine rotation speed, the second target engine rotation speed calculation method comprising the following steps:

acquiring a start acceleration when the hybrid electric vehicle starts;

comparing the start acceleration with a preset acceleration;

when the start acceleration is smaller than the preset acceleration, searching a target engine rotation speed of the next cycle corresponding to a current engine rotation speed from a third preset relationship table storing the relationship between current engine rotation speed and the engine rotation speed of the next cycle; and when the start acceleration is greater than or equal to the preset acceleration, searching a target engine rotation speed of the next cycle corresponding to the current engine rotation speed from a fourth preset relationship table storing the relationship between the current engine rotation speed and the target engine rotation speed of the next cycle, the fourth preset relationship table being different from the third preset relationship table.

8. The parallel start control method for the hybrid electric vehicle according to claim 3, wherein the start pre-engagement torque is determined by:
   acquiring a current vehicle speed of the hybrid electric vehicle; and
   looking up a first preset mapping relationship table storing the relationship between the vehicle speed and the start pre-engagement torque, to determine the start pre-engagement torque corresponding to the current vehicle speed.

9. The parallel start control method for the hybrid electric vehicle according to claim 2, wherein when the start mode of the hybrid electric vehicle is a neutral taxiing start mode, the step of determining the start clutch request torque based on the start basic torque according to the start mode of the hybrid electric vehicle comprises:
   taking a larger one of the start basic torque and zero, and limiting upper and lower limits of the value of the larger one, to obtain a second start limiting torque;
   when the brake pedal of the hybrid electric vehicle is pressed, taking a smaller one of the second start limiting torque and the brake clutch request torque as a second to-be-requested clutch torque;
   when an engine rotation speed of the hybrid electric vehicle is smaller than a target idle rotation speed, determining an anti-flameout clutch torque by looking up a table according to a variation rate of the engine rotation speed and a difference obtained by subtracting the target idle rotation speed from the engine rotation speed; and
   taking a smaller one of the second to-be-requested clutch torque and the anti-flameout clutch torque as the start clutch request torque.

10. The parallel start control method for the hybrid electric vehicle according to claim 9, wherein the step of determining the start clutch request torque based on the start basic torque according to the start mode of the hybrid electric vehicle further comprises:
    when the brake pedal of the hybrid electric vehicle is not pressed, and the engine rotation speed is greater than or equal to the target idle rotation speed, taking the second start limiting torque as the start clutch request torque;
    when the brake pedal of the hybrid electric vehicle is not pressed, and the engine rotation speed is smaller than the target idle rotation speed, taking a smaller one of the second start limiting torque and the anti-flameout clutch torque as the start clutch request torque; and
    when the brake pedal of the hybrid electric vehicle is pressed, and the engine rotation speed is greater than or equal to the target idle rotation speed, taking the second to-be-requested clutch torque as the start clutch request torque.

11. The parallel start control method for the hybrid electric vehicle according to claim 2, wherein when the start mode of the hybrid electric vehicle is a launch control start mode, the step of determining the start clutch request torque based on the start basic torque according to the start mode of the hybrid electric vehicle comprises:
    adding a start pre-engagement torque and a start clutch compensation torque of the hybrid electric vehicle to the start basic torque, to obtain a second pre-request clutch torque;
    when an engine rotation speed of the hybrid electric vehicle is smaller than a target idle rotation speed, determining an anti-flameout clutch torque by looking up a table according to a variation rate of the engine rotation speed and a difference obtained by subtracting the target idle rotation speed from the engine rotation speed;
    taking a smaller one of the second pre-request clutch torque and the anti-flameout clutch torque as the start clutch request torque; and
    when the engine rotation speed of the hybrid electric vehicle is greater than or equal to the target idle rotation speed, taking the second pre-request clutch torque as the start clutch request torque.

12. The parallel start control method for the hybrid electric vehicle according to claim 2, wherein it is determined that the over-heat protection condition is met when the following conditions are met synchronously:
    the temperature of the clutch is greater than or equal to 220° C., and the temperature of the gearbox is greater than or equal to 120° C.;
    the start mode of the hybrid electric vehicle is the accelerator pedaling start mode or launch control start mode;
    the variation rate of the engine request torque is smaller than a first preset variation rate when a brake pedal of the hybrid electric vehicle is pressed, and the variation rate of the engine request torque is smaller than a second preset variation rate when the brake pedal is not pressed, the first preset variation rate being smaller than the second preset variation rate;
    the difference obtained by subtracting the engine request torque from a maximum engine torque limit value corresponding to the current engine rotation speed of the hybrid electric vehicle is greater than a preset torque value; and
    a current vehicle speed of the hybrid electric vehicle is smaller than or equal to a preset speed vehicle.

13. The parallel start control method for the hybrid electric vehicle according to claim 1, wherein the steps of judging whether the hybrid electric vehicle meets the over-heat protection condition according to the current working conditions of the clutch and the gearbox, and determining the start basic torque according to the judging result and the engine request torque; and determining the start clutch request torque based on the start basic torque according to the start mode of the hybrid electric vehicle, comprise
    when the clutch is in a completely engaged working condition, judging whether the hybrid electric vehicle meets the over-heat protection condition;
    when determining that the hybrid electric vehicle meets the over-heat protection condition, subtracting a preset over-heat protection offset torque from the engine request torque, to obtain the start basic torque, and taking the start basic torque as the start clutch request torque; and
    when the hybrid electric vehicle does not meet the over-heat protection condition, taking the engine request torque as the start clutch request torque.

14. The parallel start control method for the hybrid electric vehicle according to claim 1, further comprising the following steps:
    when the clutch is in an incompletely engaged working condition and the gearbox is in an off-gear working condition, determining that the start clutch request torque is equal to zero.

15. The parallel start control method for the hybrid electric vehicle according to claim 1, further comprising the following steps:

when the clutch is in a completely engaged working condition, or the clutch is in a incompletely engaged working condition and the gearbox is in an off-gear working condition, determining that an engine compensation torque is equal to zero;

when the clutch is in an incompletely engaged working condition and the gearbox is in an in-gear working condition, calculating the engine compensation torque by using an engine compensation torque calculation method;

adding the engine compensation torque to the engine request torque, to obtain an engine target torque;

when a brake pedal of the hybrid electric vehicle is pressed, limiting the limits of the engine target torque, to obtain a start engine request torque; and conducting start control on the engine according to the start engine request torque.

16. The parallel start control method for the hybrid electric vehicle according to claim 15, wherein the engine compensation torque calculation method comprises the following steps:

when the hybrid electric vehicle meets the over-heat protection condition, adding a start engine compensation torque to a start pre-engagement torque of the hybrid electric vehicle, and further adding a preset over-heat protection offset torque, to obtain the engine compensation torque, wherein the start engine compensation torque is equal to a P-term torque of the hybrid electric vehicle; and when the hybrid electric vehicle does not meet the over-heat protection condition, adding the start engine compensation torque to the start pre-engagement torque, to obtain the engine compensation torque.

17. The parallel start control method for the hybrid electric vehicle according to claim 15, wherein in the step of, when the brake pedal of the hybrid electric vehicle is pressed, limiting the limits of the engine target torque, to obtain the start engine request torque, the method of limiting the limits of the engine target torque comprises:

when the brake pedal of the hybrid electric vehicle is pressed, determining a brake clutch request torque when the brake pedal is pressed; and taking a smaller one of the engine target torque and the brake engine request torque as the start engine request torque.

18. A parallel start control system for a hybrid electric vehicle, comprising a control device, wherein the control device comprises a memory and a processor, a control program is stored in the memory, and the control program is used to implement a parallel start control method for the hybrid electric vehicle when executed by the processor, wherein the parallel start control method for the hybrid electric vehicle comprises the following steps:

acquiring current working conditions of a clutch and a gearbox of the hybrid electric vehicle, an engine request torque of the hybrid electric vehicle and a start mode of the hybrid electric vehicle;

judging whether the hybrid electric vehicle meets an over-heat protection condition according to the current working conditions of the clutch and the gearbox, and determining a start basic torque according to a judging result and the engine request torque;

determining a start clutch request torque based on the start basic torque according to the start mode of the hybrid electric vehicle; and conducting start control on the clutch according to the start clutch request torque.

19. A hybrid electric vehicle, comprising a parallel start control system for the hybrid electric vehicle wherein the parallel start control system comprises a control device, the control device comprises a memory and a processor, a control program is stored in the memory, the control program is used to implement a parallel start control method for the hybrid electric vehicle when executed by the processor, the parallel start control method for the hybrid electric vehicle comprises the following steps:

acquiring current working conditions of a clutch and a gearbox of the hybrid electric vehicle, an engine request torque of the hybrid electric vehicle and a start mode of the hybrid electric vehicle;

judging whether the hybrid electric vehicle meets an over-heat protection condition according to the current working conditions of the clutch and the gearbox, and determining a start basic torque according to a judging result and the engine request torque;

determining a start clutch request torque based on the start basic torque according to the start mode of the hybrid electric vehicle; and conducting start control on the clutch according to the start clutch request torque.

* * * * *